United States Patent
Yoshimoto

(10) Patent No.: US 7,575,110 B2
(45) Date of Patent: Aug. 18, 2009

(54) BUILT-IN DAMPER TYPE FRONT FORK

(75) Inventor: Tsutomu Yoshimoto, Toyko (JP)

(73) Assignee: Kayaba Industry Co., Ltd., Tokyo (JP)

( * ) Notice: Subject to any disclaimer, the term of this patent is extended or adjusted under 35 U.S.C. 154(b) by 0 days.

(21) Appl. No.: 11/588,218

(22) Filed: Oct. 27, 2006

(65) Prior Publication Data
US 2007/0102252 A1 May 10, 2007

(30) Foreign Application Priority Data
Nov. 7, 2005 (JP) ............................. 2005-321936
Sep. 19, 2006 (JP) ............................. 2006-251974

(51) Int. Cl.
*F16F 9/16* (2006.01)
*F16F 11/00* (2006.01)

(52) U.S. Cl. .................... 188/312; 267/221; 267/64.26; 188/313; 188/314; 188/315; 188/322.7

(58) Field of Classification Search ......... 188/312–315, 188/322.17; 267/221, 64.26
See application file for complete search history.

(56) References Cited

U.S. PATENT DOCUMENTS

| | | | | |
|---|---|---|---|---|
| 3,024,874 A | * | 3/1962 | De Koning et al. | 188/286 |
| 6,216,831 B1 | * | 4/2001 | Taylor | 188/280 |
| 6,234,505 B1 | * | 5/2001 | Ito | 280/276 |
| 6,244,609 B1 | * | 6/2001 | Wilson | 280/276 |
| 6,305,704 B1 | * | 10/2001 | Vignocchi et al. | 280/279 |
| 6,311,962 B1 | * | 11/2001 | Marking | 267/64.25 |
| 6,568,664 B2 | * | 5/2003 | Furuya | 267/64.26 |
| 6,659,242 B2 | * | 12/2003 | Nagai | 188/315 |
| 6,971,493 B2 | * | 12/2005 | Yoshimoto | 188/312 |
| 2002/0040833 A1 | | 4/2002 | Furuya | |
| 2003/0173170 A1 | | 9/2003 | Nagai | |
| 2004/0188975 A1 | * | 9/2004 | Yoshimoto | 280/276 |
| 2004/0226790 A1 | | 11/2004 | Yoshimoto | |

FOREIGN PATENT DOCUMENTS

| | | |
|---|---|---|
| JP | 2004-293660 | 10/2004 |
| JP | 2004-293720 | 10/2004 |

\* cited by examiner

*Primary Examiner*—Robert A Siconolfi
*Assistant Examiner*—Mahbubur Rashid
(74) *Attorney, Agent, or Firm*—Rabin & Berdo, PC

(57) ABSTRACT

A both-side rod type damper (11) is arranged in a storage chamber (40) formed inside an inner tube (2) and an outer tube (3), rods (31) and (32) of the damper (11) are coupled so as to move by the same quantity in accordance with the extending or retracting operation of a front fork, a bearing (5) for slidably supporting the rod (32) is provided at a cylinder end, the bearing (5) is movable by a predetermined quantity in a radius direction and an axial direction of the rod relative to the cylinder, and the bearing (5) moves toward the inside of the cylinder to communicate the oil chamber R2 with the storage chamber (40) when the pressure of the storage chamber (40) is higher than the pressure of the oil chamber R2 in the damper (11), and the communication is shut down when the movement is made to the opposite side thereof.

2 Claims, 3 Drawing Sheets

BUILT-IN DAMPER TYPE FRONT FORK

BACKGROUND OF THE INVENTION

1. Field of the Invention

The present invention relates to a front fork housing with a both-side rod type damper therein to be used for a motorcycle and the like.

2. Description of the Related Art

There are, structure-wise, two types of dampers, namely a one-side rod type having a rod protruded from one end of a cylinder and a both-side rod type having rods protruded from both ends of the cylinder.

Of the one-side rod type damper, an effective volume of oil chambers on both sides interposing a piston between them varies by a penetrating or retracting volume of the rod into or out of the damper when the damper is operated in extending or retracting movement. Accordingly, in order to absorb the varied volume thereof, a reservoir having an air storage is required. When the air in the reservoir is mixed with working oil, so-called aeration is caused and the damping force of the damper may become unstable or the like.

To the contrary, with the both-side rod type damper, since the volumes of the oil chambers of both sides of the piston varies respectively by the same quantity (when the oil chamber of one side expands, the oil chamber of the other side contracts) at the time of the extending or retracting operation of the damper, there is no variation in total quantity of the working oil in both of the oil chambers, therefore, there is no necessity of escaping the surplus or supplementing the shortage of the working oil, and thus the above-mentioned reservoir becomes unnecessary, and as a result, the damping force characteristic is stabilized.

A front fork housing the both-side rod type damper therein is proposed in JP-2004-293720A and JP-2004-293660A.

Since the both-side rod type damper has the rods protruding from both ends of the cylinder, slidability of the rod at a bearing which supports each of the rods at both ends of the cylinder is apt to be deteriorated when the concentricity of the rod is lost, when the rod is inclined relative to the cylinder, or the like. The former intends to eliminate this problem by movably coupling one of the rods in the radius direction relative to the piston.

Further, since the both-side rod type damper is arranged inside the front fork, it is troublesome to inject the working oil into the damper when filling the working oil into the front fork in the final process of manufacturing in a factory.

In the latter above-mentioned, a check valve is provided at a part of the damper, and filling of working oil is performed by absorbing the working oil filled in the front fork into the damper through the check valve by the extending or retracting operation of the damper. Thereby the filling operation of the working oil is made easy.

SUMMARY OF THE INVENTION

Conventionally, in order to solve the two problems as above-mentioned, it is necessary for an ordinary damper to alter the coupling structure of the rod for the piston and to provide the check valve at a part of the damper, respectively.

If the different structure is adopted for each part in this way, the structure of the damper becomes complicated and the cost of the manufacture thereof is also increased. Furthermore, when any of faults such as breakdown of respective structures is caused, a repair or replacement work of the parts is also troublesome.

An object of the present invention is to solve such problems.

In order to achieve above the object the invention provides a front fork, which comprises an outer tube, an inner tube slidably inserted into the outer tube, a storage chamber formed inside the inner tube and the outer tube, a damper arranged in the storage chamber and including, a cylinder, a piston which slides in the cylinder, a pair of oil chambers defined inside the cylinder by the piston, and a pair of rods which are coupled with the piston and are protruded from both ends of the cylinder, the rods displacing by the same quantity in accordance with an extending or retracting operation of the front fork, and a bearing provided on a cylinder end to slidably support at least one of the rods protruding from the end of the cylinder. The bearing moves by a predetermined quantity in a radius direction and an axial direction of the rod relative to the cylinder, and the bearing moves toward an inside of the cylinder to communicate the oil chamber with the storage chamber when the pressure of the storage chamber facing one side of the bearing is higher than the pressure of the oil chamber facing the other side of the bearing, and shuts down the communication when moving to the opposite side thereof.

BRIEF DESCRIPTION OF THE DRAWINGS

Other objects, features, and advantages of the present invention will become more apparent from the following detailed description made with reference to the accompanying drawings, in which like portions are designated by like reference numbers and in which.

DESCRIPTION OF THE PREFERRED EMBODIMENT

Hereinafter, description will be made of the present invention based on embodiments shown in FIGS. 1-3.

Figure 1:
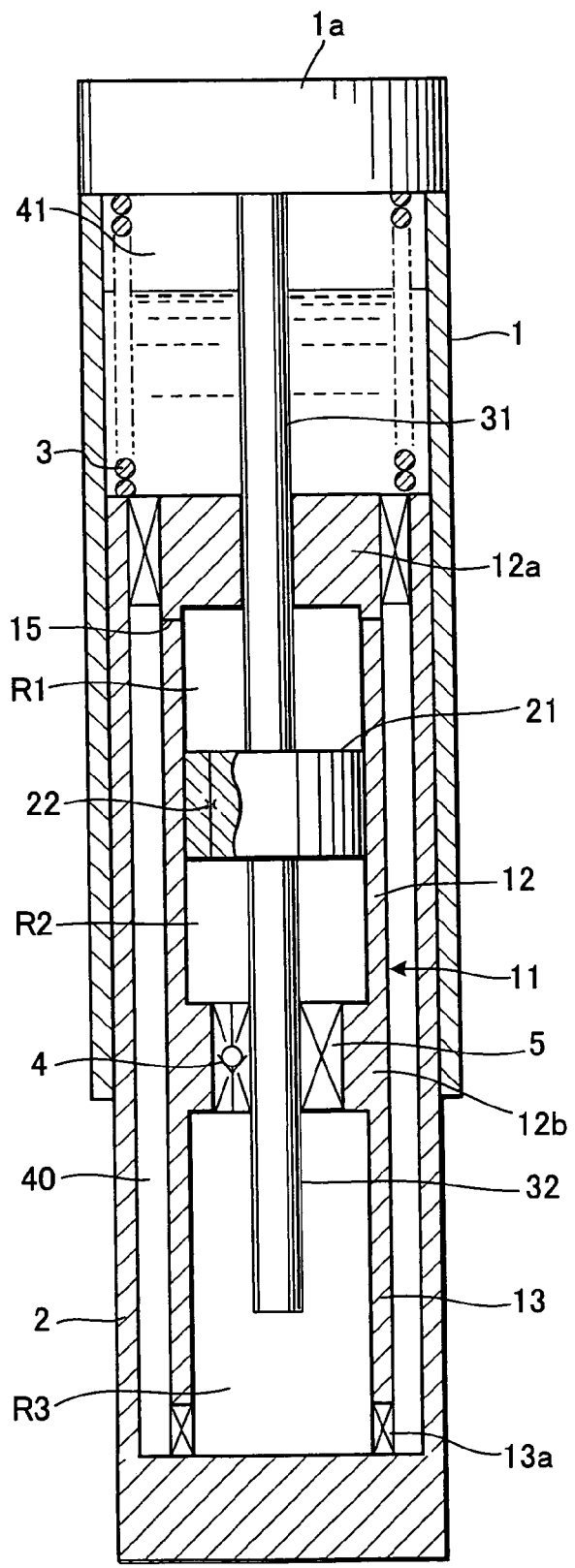
FIG. 1 is a schematic cross-sectional view of a structure principally showing a built-in damper type front fork in an embodiment according to the present invention.

A built-in damper type front fork in an embodiment according to the present invention is, as shown in FIG. 1, provided with an outer tube 1 coupled to a vehicle body side, and an inner tube 2 coupled to a vehicle axle side, which are slidably engaged mutually.

Inside the front fork, a suspension spring 3 is interposed between the outer tube 1 and the inner tube 2, and the front fork is urged in the extension direction by a spring force of the suspension spring 3.

Inside a storage chamber 40 defined inside the outer tube 1 and the inner tube 2, a both-side rod-type damper 11 is arranged coaxially with the tubes 1 and 2.

The storage chamber 40 is filled with working oil, and functions as a reservoir of the damper 11, and an upper part of the inside of the storage chamber 40 constitutes an air storage 41 filled with air. The air storage 41 is compressed when the front fork is operated to compress to achieve an air-spring effect.

The damper 11 is provided with a cylinder 12, a piston 21 which slides in the inside of the cylinder 12, and rods 31 and 32 coupled with the both sides of the piston 21, respectively.

The damper 12 is provided with a head 12a which closes an upper end of the cylinder 12 and a bottom 12b which closes a lower end thereof similarly, as shown in FIG. 1. The rod 31 slidably penetrates through the head 12a, and the rod 32 slidably penetrates through the bottom 12b.

A tip end of the rod 31 is coupled with a cap 1a of the outer tube 1.

Further, the cylinder 12 is extended downward passing the bottom 12b in FIG. 1, and the lower end of the extended cylinder 13 is coupled with the bottom of the inner tube 2.

Resultantly, when the front fork is operated to extend or retract, the piston 21 of the damper 11 moves inside the cylinder 12. The inside of the cylinder 12 is defined into two oil chambers R1 and R2 by the piston 21, and the oil chambers R1 and R2 are filled with the working oil.

The rods 31 and 32 are formed with the same rod cross-sectional area, respectively, thereby effective pressure receiving areas of the piston 21 facing the two oil chambers R1 and R2 are made the same, respectively. In this case, while the load is applied to the rod 31, there is no direct load applied to the rod 32. Therefore high strength is not required for the rod 32, and as a result, the rod 32 may be formed with a lightweight piping member.

The piston 21 is provided with a damping valve 22 which communicates the two oil chambers R1 and R2 mutually. With the movement of the piston 21, the working oil passes through the damping valve 22 and moves between the oil chambers R1 and R2, but a damping force of the damper 11 is generated in accordance with the fluid resistance at this time.

Since the effective cross-sectional areas of the two oil chambers R1 and R2 are the same, if the effective volume of one of the oil chambers is increased when the piston 21 moves, the effective volume of the other of the oil chambers is decreased by the same quantity. Therefore, in principle, the working oil does not enter into or come out from the storage chamber 40 outside the cylinder 12.

However, the cylinder 12 is formed with a path 15, having a small cross-sectional area for communicating the oil chamber R1 with the storage chamber 40, at an upper end of the cylinder 12 neighboring to the head 12a. Accordingly, in a case when the temperature of the working oil is varied to dilate the working oil or the like, the working oil in the damper can freely flow to and from the storage chamber 40. Thus so-called temperature compensation is made possible. It should be noted that it is preferable that the cross-sectional area of the path 15 is made sufficiently smaller than the cross sectional area of a flow path of the damping valve 22, and the damping force generated at the damping valve 22 is dominant of the damping force of the damper 11.

Further, as described hereinafter, the path 15 also has a function of discharging the air in the damper 11 to the storage chamber 40 at the time when the working oil is charged into the damper or the like.

An auxiliary oil chamber R3 is formed inside the extended cylinder 13 of the cylinder 12. The oil chamber R3 is communicated with the storage chamber 40 through an opening 13a provided at the lower end of the extended cylinder 13.

In the oil chamber R3, the rod 32 penetrating through the bottom 12b of the cylinder 12 is positioned, and thus the extended cylinder 13 is formed longer in the axial direction than the maximum protrusion stroke quantity of the rod 32 in order to ensure the operation of the damper 11.

The head 12a through which the rod 31 of the one side penetrates has a bearing member and a sealing member (not shown) to prevent oil leakage from between the rod 31 and the bearing member while securing slidability of the rod 31.

A bearing 5 is provided to the bottom 12b of the cylinder 12, and the rod 32 slidably penetrates through the bearing 5.

The bearing 5 is provided movably in the rod radius direction relative to the bottom 12a so that the movement within a minute range toward the radius direction of the rod 32 can be allowed. Further, the bearing 5 is made movable within a predetermined range also in the rod axial direction, and thus it moves in the axial direction in accordance with the pressure difference between the oil chamber R2 of the inside of the cylinder 12 and the oil chamber R3 of the outside thereof. And in accordance therewith, the oil chamber R2 is communicated with the oil chamber R3, or the communication is shut down. In other words, the bearing 5 functions as the check valve 4, which allows inflow of the working oil from the oil chamber R3 into the oil chamber R2 in the cylinder, and blocks the flow of the working oil in the opposite direction.

By moving the bearing 5 in the rod radius direction, at the time when a bending load is applied between the damper 11 and the rods 31 and 32 or the like, deflection of each of the rods 31 and 32 is prevented by a slight quantity of the movement of the rod 32 in the radius direction, thus maintaining smooth movement in the axial direction.

Furthermore, the check valve 4 allows the inflow of the working oil into the damper 11 from the storage chamber 40, when the working oil is charged into the front fork, details thereof being described hereinafter.

Figure 2:
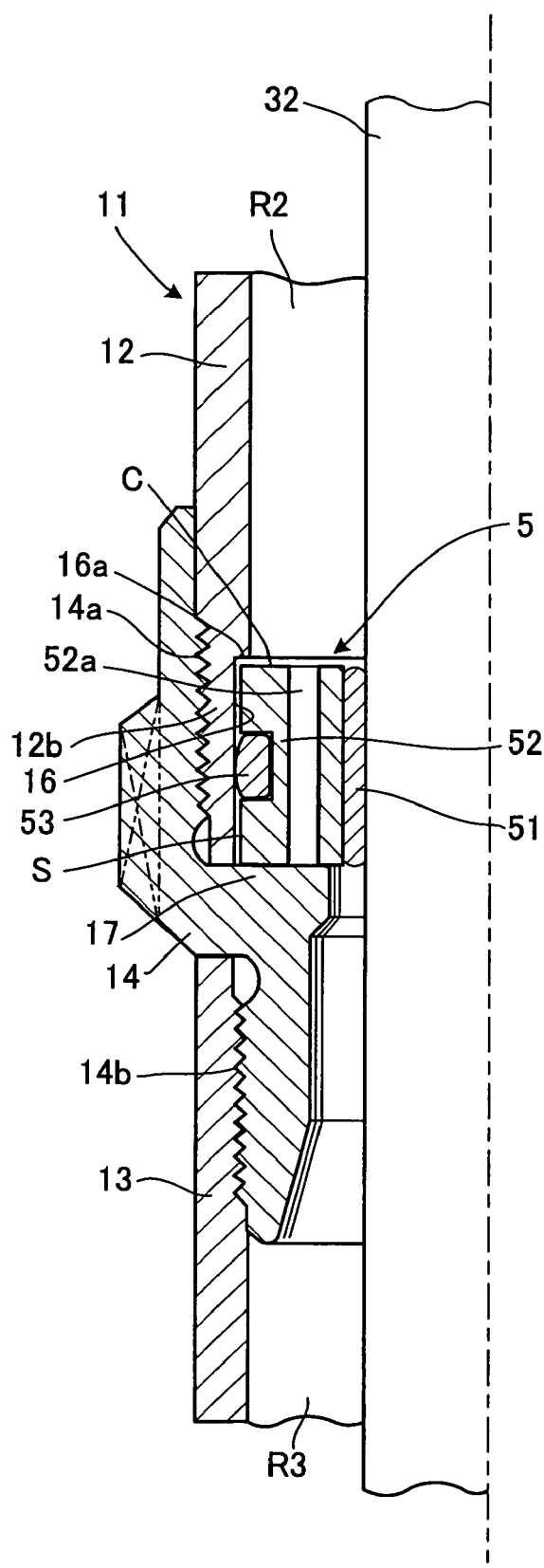
FIG. 2 is a cross-sectional view showing an enlarged bearing in the embodiment according to the present invention.

The structure of the bearing 5 is described in detail in accordance with FIG. 2.

The bearing 5 is formed in a hollow disk shape as a whole, and is provided with a tubular bush member 51 that slides in contact with the external circumference of the rod 32, a tubular valve body 52 formed for retaining the bush member 51 from outside, and an O ring 53 as an elastic member interposed on the external circumference of the valve body 52 in that order from the inner side thereof.

A coupling tube 14 is arranged at the lower end of the cylinder 12, and a screw thread of the external circumference at the lower end of the cylinder 12 is engaged with the internal circumference screw thread 14a of the upper part of the coupling tube 14. In addition, a screw thread of the upper end internal circumference of the extended cylinder 13 is engaged with the external circumference screw thread 14b of the lower part of the coupling tube 14.

The intermediate part of the coupling tube 14 forms a flange 17 which protrudes inward. Furthermore, a diameter enlarged portion 16 is formed on the lower end internal circumference of the cylinder 12, where the inner diameter thereof is enlarged as compared to a piston sliding surface. Inside the diameter enlarged portion 16, the bearing 5 is accommodated and a bottom surface of the bearing 5 is seated on the flange 17.

A predetermined gap "S" is annularly formed between the external circumference of the bearing 5 and the internal circumference of the diameter enlarged portion 16, and the annular gap is sealed by the O ring 53 interposed on the external circumference of the bearing 5. Accordingly, the bearing 5 is able to move while compressing the O ring 53 in the radial direction.

Although the bearing 5 is seated on the flange 17, a predetermined gap "C" is formed between the upper surface of the bearing 5 and a step 16a of the diameter enlarged portion 16, and therefore, the bearing 5 is able to leave away from the flange 17 to move toward the axial direction of the rod 32.

A path 52a extending in the axial direction is formed in the valve body 52 in such a way as to penetrate there through, and when the valve body 52 is seated on the flange 17, the path 52a is closed to shut down the communication between the oil chamber R2 inside the cylinder 12 and the oil chamber R3 outside of the cylinder 12, but when it leaves away from the flange 17, the path 52a is opened to communicate the oil chamber R2 with the oil chamber R3. In other words, the check valve 4 is composed of the above structure.

In this way, the bearing 5 allows displacement of the rod 32 in the radius direction relative to the cylinder 12 within a range of the gap "S", and also the bearing 5 moves in the rod axial direction together with the valve body 52 within the range of the gap "C" in accordance with the pressure difference between the oil chambers R2 and R3. Thus when the path 52a is opened or closed, the inflow of the working oil from the oil chamber R3 into the oil chamber R2 is allowed, and the flow in the opposite direction thereof is blocked.

It should be noted that the bearing 5 is accommodated in the diameter enlarged portion 16 of the cylinder 12 before the coupling tube 14 is connected to the cylinder 12. Thereafter, the bearing 5 is seated on the flange 17 by engaging the coupling tube 14 with the lower end of the cylinder 12.

Here, description is made of a method of filling the working oil into the both-side rod type damper 11 after the front fork is assembled.

A cap 1a at the upper end of the outer tube 1 of the front fork is removed, and the working oil of a predetermined quantity is injected into the storage chamber 40 of the front fork. The working oil flows into the oil chamber R3 which is a part of the storage chamber 40. In this state, no working oil exists in the damper 11, and the oil chambers R1 and R2 are filled with the air. Thereafter, in a state where the cap 1a is clamped to seal the front fork, the front fork is worked in an extending or retracting operation (pumping operation).

When the front fork is extended, the piston 21 moves upward in the damper 11 in the figure, and therefore, the oil chamber R1 in the cylinder 12 is compressed to increase the pressure therein, and the oil chamber R2 is enlarged to lower the inner pressure thereof. As a result, the working oil of the oil chamber R3 causes the check valve 4 to open, flowing into the oil chamber R2, and a part of the air in the oil chamber R1 is also pushed out to the storage chamber 40 outside the cylinder 12 from an air vent path 15.

In reverse operation to the above state, the front fork is contracted, the piston 21 comes down in the damper 11 in the figure, and therefore, the oil chamber R1 of the cylinder 12 is enlarged to lower the pressure, while the oil chamber R2 is compressed to increase the pressure thereof. As a result, the check valve 4 is closed, and the air and the working oil in the oil chamber R2 are pushed into the oil chamber R1 through the damping valve 22.

By repeatedly performing such operation, namely the extending or retracting operation of the front fork, the working oil is sucked into the damper 11 from the storage chamber 40 of the front fork, and the damper 11 is gradually filled with the working oil. The air which has originally existed in the damper 11 is guided to an air chamber 41 of the upper part of the storage chamber 40, and functions as an air spring.

When the inside of the damper 11 is fully filled with the working oil, the air is discharged from the inside of the damper 11. Thereafter, the check valve 4 is seldom opened or closed at the extension or compression stroke of the front fork, in principle.

When the piston 21 moves inside the damper 11, and, for example, the volume of the oil chamber R1 of one side is increased, the volume of the oil chamber R2 of the other side is reduced. The increased quantity and reduced quantity of the respective chambers at this time are the same. Therefore, if the oil chambers R1 and R2 in the damper 11 are filled with the working oil, the quantity of the working oil which moves from the oil chamber R1 of the one side to the oil chamber R2 of the other side by movement of the piston 21 does not change even if the piston 21 moves in whichever direction.

Accordingly, for example, even if the piston 21 goes up in the cylinder 21 and the oil chamber R2 is enlarged to lower the pressure therein, the high-pressure working oil from the shrinking oil chamber R1 of the other side flows into the oil chamber R2 through the damping valve 22 to supplement the enlarged volume amount of the oil chamber R2. Therefore the working oil from the oil chamber R3 does not flow into the oil chamber R2, since the oil chamber R2 is filled with the working oil flowing from the oil chamber R1.

However, in practice, the working oil in a minute quantity flows from the path 15 into the storage chamber 40 as a reservoir during the compressing process of the oil chamber R1, and therefore, the working oil of this outflow quantity causes shortage. Therefore, the working oil of the quantity of the shortage is absorbed from the oil chamber R3 into the oil chamber R2 through the check valve 4.

In this way, the working oil moves between the oil chambers R1 and R2 of the damper 11 through the damping valve 22 when the front fork is operated normally, and a predetermined damping force is generated in accordance with the flow path drag which the working oil receives at this time.

Further, the rod 32 penetrating through the bearing 5 is allowed to move in the radius direction of the rod 32 together with the bearing 5 at the time of the extending or retracting operation of the front fork, thereby the smooth extending or retracting operation is regularly maintained.

That is to say, when the rods 31 and 32 coaxially arranged mutually are inclined relative to the cylinder 12 as in a case where inclination is generated in the axis center of the outer tube 1 and the inner tube 2 and the axis center of the damper 11, or the like, a displacement quantity from the axis center of the lower rod 32 is larger in comparison with that of the upper rod 31.

When the rod 32 displaces from the axis center of the front fork, the valve body 52 moves in the radius direction of the rod 32 together with the bush member 51 to distort the O ring 53, thereby allowing the movement of the bearing 5. Therefore, the inclination of the rod 32 relative to the axis center of the damper 11 is allowed, thereby restraining an increase in friction on the rod sliding surface relative to the bearing 5 to provide a smooth sliding characteristic.

As described above, the check valve 4 is assembled in the bearing 5 which allows movement of the rod 32 in the radius direction. Therefore, the structure is simplified, the number of constituting parts is reduced, and accordingly the cost of the parts can be also reduced.

Furthermore, in such a case when a fault is generated in the constituting members of the bearing 5 or the like, the bearing 5 can easily be replaced if the coupling tube 14 which is engaged with the lower part of the cylinder 12 of the damper 11 is removed.

Figure 3:
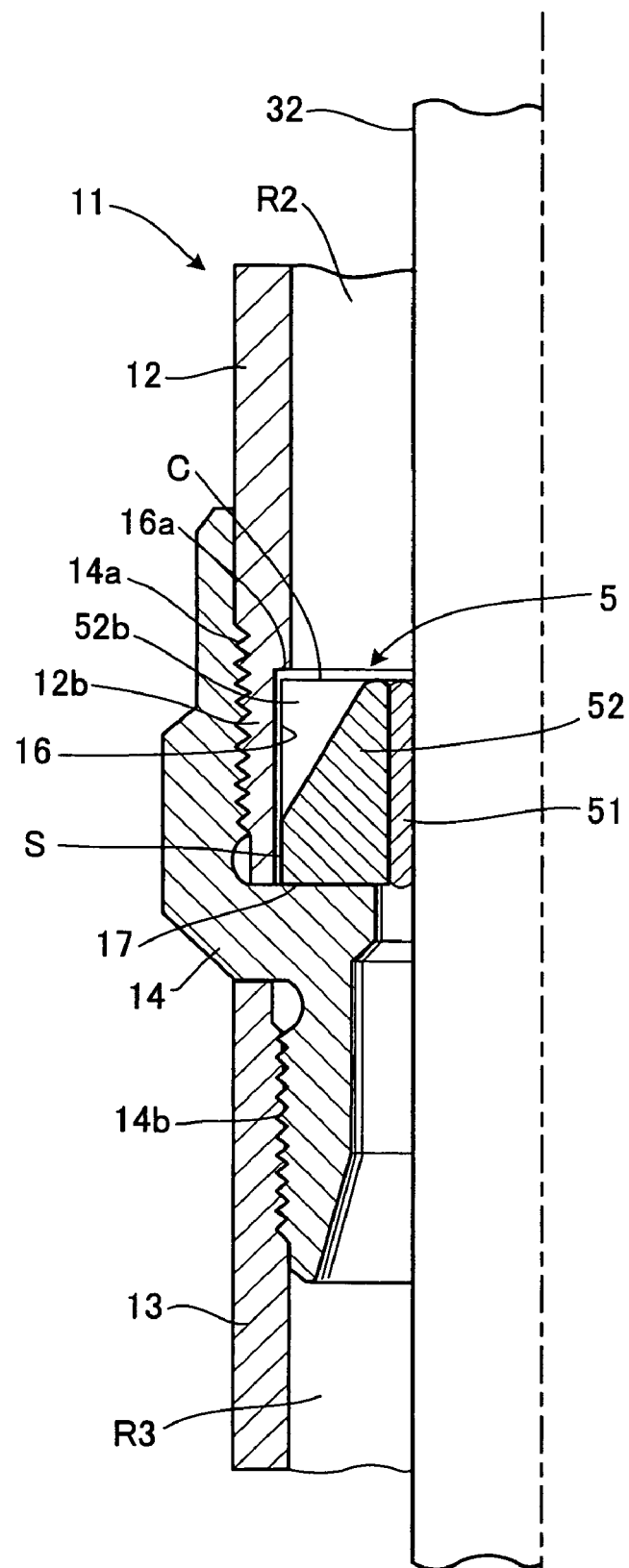
FIG. 3 is an enlarged cross-sectional view showing a bearing in a different embodiment.

Now, description is made of a different embodiment of the bearing 5 in accordance with FIG. 3.

The bearing 5 has the check valve 4 of which structure is different from that shown in FIG. 2.

The bearing 5 has a tubular bush member 51 which slides in contact with the external circumference of the rod 32, and a tubular valve body 52 arranged outside the bush member 51. A gap "S" is formed between the external circumference of the valve body 52 and the internal circumference of the diameter enlarged portion 16 of the cylinder 12, as is similar to the above-mentioned embodiment.

The valve body 52 is provided, on a part of the external circumference thereof, with a notched groove inclined toward the axial direction at a position facing the oil chamber R2 in the cylinder 12, which constitutes a path 52b which communicates the oil chamber R2 with the gap "S".

The path 52b is opened when the pressure of the oil chamber R2 is lowered and the valve body 52 is lifted in FIG. 3, namely, the valve body 52 is moved toward the side of the oil chamber R2, and the valve body 52 leaves away from a flange 17, thereby communicating the oil chamber R3 with the oil chamber R2. Further, to the contrary, when the pressure of the oil chamber R2 is higher than the pressure of the oil chamber R3, and the valve body 52 comes down to be seated on the flange 17, the lower end of the gap "S" as a part of the path 52b is blocked, and the communication between the oil chamber R2 and the oil chamber R3 is shut down.

In this way, the bearing 5 is provided with the check valve 4 which allows the working oil to flow into the oil chamber R2 from the oil chamber R3, and shuts down the flow in the opposite direction.

In this case, the gap "S" on the external circumference of the valve body 52 can be made greater in a cross-sectional area than that of the path 52a which penetrates in the axial direction through the valve body 52 shown in FIG. 2 mentioned above. Thereby the resistance of the flow of the working oil toward the oil chamber R2 from the oil chamber R3 can be made smaller, and the oil chambers R1 and R2 in the damper 11 can be speedily filled, when the working oil is filled into the damper 11.

It should be noted that, in the above-described embodiment, although the bearing 5 having the check valve 4 is provided at the bottom 12b, the bearing 5 may be provided, instead thereof, at the head 12a, although not shown, or may also be provided at both of the bottom 12b and the head 12a, and in particular when it is provided at both of them, speedy filling of the working oil into the respective oil chambers R1 and R2 can be realized, which is advantageous in a point of improving an injection work of the working oil into the damper 11.

Furthermore, although the air vent path 15 is provided in an upper part of the cylinder 12, instead thereof, although not shown, a minute sliding gap existing between the rod and the bearing member may also be utilized as the air vent path, without providing the sealing member, on the bearing through which the rod 31 of the head 12a penetrates.

In the case when the sliding gap is changed for the air vent path, a dimension of the gap is preferably designed in such a way that passage of the air is allowed when injecting the working oil but the passage of the working oil is substantially blocked when the front fork is in an extending or retracting operation.

Furthermore, although there is shown a case where a so-called inverted-type front fork is used as the front fork, where the outer tube 1 is made to be a vehicle body-side tube and the inner tube 2 is made to be a vehicle axle-side tube, from what is intended by the present invention, although not shown, a so-called erecting type may also be used, where the vehicle body-side tube is made to be the inner tube, and the vehicle axle-side tube is made to be the outer tube, and it goes without saying that, in this case, there is also no difference whatsoever in the operational effect thereof.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A front fork, comprising:
    an outer tube;
    an inner tube slidably inserted into the outer tube;
    a storage chamber formed inside the inner tube and the outer tube;
    a damper arranged in the storage chamber and including:
        a cylinder having an air vent path formed in an upper part thereof, the cylinder further having a first and a second end;
        a piston which slides in the cylinder;
        an upper and a lower oil chamber defined inside the cylinder by the piston, the upper oil chamber being in fluid communication with the storage chamber via the air vent path; and
        a pair of rods which are coupled with the piston and are respectively protruded from the first and second ends of the cylinder, the rods displacing by the same quantity in accordance with an extending or retracting operation of the front fork; and
    a bearing provided at the second end of the cylinder and accommodated inside a flange extending toward an internal circumference from the second end of the cylinder and inside a diameter enlarged portion having a step provided on the internal circumference of the second end of the cylinder, the bearing slidably supporting at least one of the rods protruding from the second end of the cylinder,
    the bearing having opposing first and second sides, a tubular bush member which slides in contact with an external circumference of the rod, a tubular valve body for retaining the bush member on an internal circumference thereof, a oath provided through the bearing in the valve body to penetrate through the valve body in the axial direction of the rod; and an elastic member interposed on the external circumference of the valve body and contacting the internal circumference of the diameter enlarged portion,
    the bearing moving by a predetermined quantity in a radius direction and an axial direction of the rod relative to the cylinder, the bearing moving in the axial direction toward an inside of the cylinder to open the path through the bearing to allow the lower oil chamber and the storage chamber to be in fluid communication when the pressure of the storage chamber facing the first side of the bearing is higher than the pressure of the lower oil chamber facing the second side of the bearing, and the bearing closing the path through the bearing when the bearing is not moved in the axial direction toward the inside of the cylinder,
    wherein a first gap is formed between the external circumference of the bearing and the internal circumference of the diameter enlarged portion, and a second gap is formed between an upper end of the bearing and the step, and
    the bearing moves away from the flange to communicate the lower oil chamber with the storage chamber when the pressure of the lower oil chamber in the cylinder is lower than the pressure of the storage chamber outside the cylinder, and is seated on the flange to shut down the communication through the valve when the pressure of the lower oil chamber is higher than the pressure of the storage chamber.

2. The front fork according to claim 1, wherein the first end of the cylinder is an upper end of the cylinder, and the second end of the cylinder is a lower end of the cylinder.

* * * * *